(12) United States Patent
Manabe et al.

(10) Patent No.: US 10,490,832 B2
(45) Date of Patent: Nov. 26, 2019

(54) POWER GENERATION SYSTEM AND METHOD FOR ACTIVATING FUEL CELL IN POWER GENERATION SYSTEM

(71) Applicant: MITSUBISHI HITACHI POWER SYSTEMS, LTD., Kanagawa (JP)

(72) Inventors: So Manabe, Tokyo (JP); Yukimasa Nakamoto, Tokyo (JP); Hiroyuki Ozawa, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 110 days.

(21) Appl. No.: 15/935,649

(22) Filed: Mar. 26, 2018

(65) Prior Publication Data

US 2018/0212261 A1    Jul. 26, 2018

Related U.S. Application Data

(62) Division of application No. 14/436,666, filed as application No. PCT/JP2013/079160 on Oct. 28, 2013, now Pat. No. 9,979,033.

(30) Foreign Application Priority Data

Oct. 31, 2012  (JP) ................ 2012-240727
Nov. 12, 2012  (JP) ................ 2012-248825

(51) Int. Cl.
| | |
|---|---|
| H01M 8/04111 | (2016.01) |
| H01M 8/04119 | (2016.01) |
| H01M 8/04089 | (2016.01) |
| H01M 8/0438 | (2016.01) |
| H01M 8/124 | (2016.01) |
| F02C 3/04 | (2006.01) |
| F02C 3/14 | (2006.01) |
| F02C 9/22 | (2006.01) |

(52) U.S. Cl.
CPC ........ *H01M 8/04111* (2013.01); *F02C 3/04* (2013.01); *F02C 3/14* (2013.01); *F02C 9/22* (2013.01); *H01M 8/04089* (2013.01); *H01M 8/04119* (2013.01); *H01M 8/04395* (2013.01); *F05D 2220/32* (2013.01); *F05D 2240/12* (2013.01); *F05D 2240/35* (2013.01); *H01M 2008/1293* (2013.01); *Y02E 20/16* (2013.01)

(58) Field of Classification Search
None
See application file for complete search history.

(56) References Cited

U.S. PATENT DOCUMENTS

2006/0222919 A1    10/2006   Tanaka et al.

FOREIGN PATENT DOCUMENTS

| JP | 60-11635 | 1/1985 |
|---|---|---|
| JP | 60-160576 | 8/1985 |
| JP | 60-216467 | 10/1985 |
| JP | 61-79856 | 4/1986 |
| JP | 62-55422 | 3/1987 |
| JP | 4-359871 | 12/1992 |
| JP | 5-144456 | 6/1993 |
| JP | 2002-298889 | 10/2002 |
| JP | 2004-176685 | 6/2004 |
| JP | 2004-220941 | 8/2004 |
| JP | 2005-135835 | 5/2005 |
| JP | 2009-205930 | 9/2009 |
| JP | 2009-205931 | 9/2009 |

OTHER PUBLICATIONS

Written Opinion of the International Searching Authority dated Jan. 21, 2014 in International (PCT) Application No. PCT/JP2013/079160
Decision of a Patent Grant dated Jan. 4, 2017 in Japanese Application No. 2012-240727, with English translation.
Office Action dated May 23, 2016 in Japanese Application No. 2012-248825, with English translation.
Decision of a Patent Grant dated Jan. 4, 2017 in Japanese Application No. 2012-248825, with English translation.
International Search Report dated Jan. 21, 2014 in International (PCT) Application No. PCT/JP2013/079160.
Office Action dated Apr. 28, 2017 in U.S. Appl. No. 14/436,666.
Office Action dated Jun. 13, 2017 in U.S. Appl. No. 14/436,666.
Office Action dated Sep. 22, 2017 in U.S. Appl. No. 14/436,666.
Notice of Allowance dated Jan. 24, 2018 in U.S. Appl. No. 14/436,666.

*Primary Examiner* — Ladan Mohaddes
(74) *Attorney, Agent, or Firm* — Wenderoth, Lind & Ponack, L.L.P.

(57) ABSTRACT

A power generation system includes a gas turbine having a compressor, a combustor, and a turbine, an inlet guide vane in an air intake port in the compressor, a first compressed air supply line for supplying compressed air compressed by the compressor to the combustor, a solid oxide fuel cell (SOFC) having an air electrode and a fuel electrode, a second compressed air supply line for supplying at least part of the compressed air compressed by the compressor to the air electrode, a control valve in the second compressed air supply line, and a control device for opening the control valve when the SOFC is activated and changing a degree of opening of the inlet guide vane from a preset reference degree of opening.

3 Claims, 8 Drawing Sheets

POWER GENERATION SYSTEM AND METHOD FOR ACTIVATING FUEL CELL IN POWER GENERATION SYSTEM

TECHNICAL FIELD

The present invention relates to a power generation system that combines a fuel cell, a gas turbine, and a steam turbine, and a method for activating a fuel cell in a power generation system.

BACKGROUND ART

The solid oxide fuel cell (hereinafter, referred to as SOFC) is known as a high efficiency fuel cell with a wide range of uses. The operating temperature of the SOFC is increased to increase the ionic conductivity, so air discharged from the compressor of a gas turbine can be used as air (oxidizing agent) supplied to the air electrode side. Also, high-temperature fuel that could not be used in an SOFC can be used as the fuel in the combustor of a gas turbine.

Therefore, various combinations of an SOFC, a gas turbine, and a steam turbine have been proposed as power generation systems that can achieve high efficiency power generation, as disclosed in, for example, Japanese Unexamined Patent Application Publication No. 2009-205930A. The combined system disclosed in Japanese Unexamined Patent Application Publication No. 2009-205930A includes an SOFC, a gas turbine combustor that burns exhaust fuel gas and exhaust air discharged from the SOFC, and a gas turbine having a compressor that compresses air for supply to the SOFC.

Technical Problem

In the conventional power generation system as described above, when the SOFC is activated, a portion of the air compressed by the compressor of the gas turbine is supplied to the SOFC to pressurize the SOFC. In this case, the compressed air supplied to the SOFC is used for pressurizing the SOFC, so it is not restored to the combustor of the gas turbine. Therefore, in the combustor, the air for combustion is insufficient so the combustion gas reaches a high temperature, and in the combustor or a turbine, cooling air is insufficient and it is difficult to provide sufficient cooling.

SUMMARY OF THE INVENTION

The present invention solves the above problems, and it is an object thereof to provide a power generation system and a method for activating a fuel cell in a power generation system that suppresses an air shortage in the gas turbine when the fuel cell is activated and enables stable activation.

Solution to Problem

The power generation system according to the present invention in order to achieve the above object includes a gas turbine having a fuel cell, a compressor, and a combustor; an inlet guide vane provided on an air intake port of the compressor; a first compressed air supply line for supplying compressed air compressed by the compressor to the combustor; a second compressed air supply line for supplying at least a portion of the compressed air compressed by the compressor to the fuel cell; an on-off valve provided on the second compressed air supply line; and a control unit for opening the on-off valve upon the fuel cell being activated and increasing the degree of opening of the inlet guide vane from a preset reference degree of opening.

Therefore, upon the fuel cell being activated, the on-off valve of the second compressed air supply line is opened and the degree of opening of the inlet guide vane of the gas turbine compressor is increased from the reference degree of opening. Also, upon the fuel cell being activated, the gas turbine compressor is able to draw in more air, and a predetermined amount of the total amount of compressed air is delivered to the combustor, and the remainder of the compressed air is delivered to the fuel cell. Therefore, there is no shortage of compressed air in the combustor and turbine at this time, so air shortage in the gas turbine is suppressed, thereby enabling stable activation.

In the power generation system according to the present invention, the on-off valve is a control valve that can adjust a flow rate, and upon the fuel cell being activated, the control unit opens the on-off valve to an initial degree of opening that is smaller than the fully opened state, and controls the degree of opening of the inlet guide vane to be open to a predetermined degree of opening that is greater than that of during steady-state operation of the gas turbine.

Therefore, upon the fuel cell being activated, by making the on-off valve provided on the second compressed air supply line a control valve, by simply adjusting the degree of opening of the single control valve, it is possible to adjust the flow rate of the compressed air supplied to the fuel cell, so it is possible to simplify the structure and reduce cost.

In the power generation system according to the present invention, the on-off valve is configured by providing in parallel a first on-off valve that passes a large flow rate upon being open and a second on-off valve that passes a small flow rate upon being open, and upon the fuel cell being activated, the control unit closes the first on-off valve and opens the second on-off valve, and controls the degree of opening of the inlet guide vane to open to a predetermined degree of opening that is greater than that during steady-state operation of the gas turbine.

Therefore, by providing two on-off valves that pass different flow rates on the second compressed air supply line, by simply opening one and closing the other of the first on-off valve and the second on-off valve, it is possible to adjust the flow rate of the compressed air supplied to the fuel cell, so the flow rate control is simplified and it is possible to reduce cost, and it is possible to rapidly switch the flow rate control.

In the power generation system according to the present invention, a first sensor that measures the pressure of the compressed air compressed by the compressor, and a second sensor that measures the pressure of the second compressed air supply line on the fuel cell side from the on-off valve are provided, and upon a second pressure measured by the second sensor reaching a first pressure measured by the first sensor, the control unit increases the degree of opening of the on-off valve, and controls the degree of opening of the inlet guide vane to restore to the reference degree of opening.

Therefore, upon the second pressure on the fuel cell side reaching the first pressure of the compressed air compressed by the compressor, by increasing the degree of opening of the on-off valve and restoring the degree of opening of the inlet guide vane to the reference degree of opening, it is possible to maintain constant the flow rate of the compressed air supplied to the combustor.

In the power generation system according to the present invention, as the second pressure measured by the second sensor approaches the first pressure measured by the first sensor, the control unit controls the degree of opening of the inlet guide vane to be reduced toward the reference degree of opening.

Therefore, by reducing the degree of opening of the inlet guide vane toward the reference degree of opening as the second pressure on the fuel cell side approaches the first pressure of the compressed air compressed by the compressor, the flow rate of the compressed air supplied to the fuel cell side is gradually reduced, it is possible to make the second pressure reach the first pressure with high accuracy, and it is possible to control the supply of compressed air with high accuracy.

Also, the method for activating a fuel cell in a power generation system according to the present invention includes the steps of: supplying compressed air compressed by a gas turbine compressor to a gas turbine combustor; supplying a portion of the compressed air compressed by the gas turbine compressor to the fuel cell; increasing the degree of opening of an inlet guide vane provided on an air intake port of the gas turbine compressor from a preset reference degree of opening; and increasing the degree of opening of the on-off valve and restoring the degree of opening of the inlet guide vane to the reference degree of opening upon the pressure of the fuel cell reaching the pressure of the compressed air compressed by the gas turbine compressor.

Therefore, upon the fuel cell being activated, there is no shortage of compressed air in the combustor and turbine, so air shortage in the gas turbine is suppressed, thereby enabling stable activation.

Also, the power generation system according to the present invention includes a gas turbine having a compressor and a combustor; a first compressed air supply line for supplying compressed air compressed by the compressor to the combustor; a fuel cell having an air electrode and a fuel electrode; a second compressed air supply line for supplying at least a portion of the compressed air compressed by the compressor to the air electrode; a first on-off valve provided on the second compressed air supply line; a compressed air supply unit connected to the second compressed air supply line on the fuel cell side from the first on-off valve; and a control unit for closing the first on-off valve and driving the compressed air supply unit upon the fuel cell being activated.

Therefore, the compressed air supply unit that can be individually driven is provided separate from the gas turbine compressor, so that the compressed air supply unit can be driven upon the fuel cell being activated. Therefore, upon the fuel cell being activated, the total quantity of compressed air compressed by the gas turbine compressor is delivered to the combustor, and the total quantity of compressed air compressed by the compressed air supply unit is delivered to the fuel cell. Therefore, there is no shortage of compressed air in the combustor and turbine at this time, so air shortage in the gas turbine is suppressed, thereby enabling stable activation.

In the power generation system according to the present invention, the compressed air supply unit includes a third compressed air supply line connected at one end thereof to the second compressed air supply line on the fuel cell side from the first on-off valve, an activation compressor connected to the other end of the third compressed air supply line, and a second on-off valve provided on the third compressed air supply line, and upon the fuel cell being activated, the control unit closes the first on-off valve, opens the second on-off valve, and drives the activation compressor.

Therefore, upon the fuel cell being activated, the first on-off valve is closed, the second on-off valve is opened, and the activation compressor is driven, so compressed air is supplied to the combustor and the fuel cell from separate compressors, so it is possible to properly suppress the air shortage in the gas turbine by a simple configuration.

In the power generation system according to the present invention, a first sensor that measures the pressure of the compressed air compressed by the compressor and a second sensor that measures the pressure of the second compressed air supply line on the fuel cell side from the first on-off valve are provided, and upon a second pressure measured by the second sensor reaching a first pressure measured by the first sensor, the control unit stops the driving of the compressed air supply unit and opens the first on-off valve.

Therefore, upon the second pressure on the fuel cell side reaching the first pressure of the compressed air compressed by the compressor, by stopping the supply of compressed air to the fuel cell side, and using just the compressed air supply unit for pressurizing the fuel cell, it is possible to reduce the size and reduce the cost. Also, there is no unnecessary pressurization of the fuel cell.

Also, the method for activating a fuel cell in a power generation system according to the present invention includes the steps of: supplying compressed air compressed by a gas turbine compressor to a gas turbine combustor; supplying compressed air compressed by a compressed air supply unit to an air electrode of a fuel cell; stopping the supply of compressed air to the air electrode by the compressed air supply unit upon the pressure on the air electrode side reaching the pressure of the compressed air compressed by the gas turbine compressor; and supplying compressed air compressed by the gas turbine compressor to the air electrode of the fuel cell.

Therefore, upon the fuel cell being activated, there is no shortage of compressed air in the combustor and turbine, so air shortage in the gas turbine is suppressed, thereby enabling stable activation.

Effect of the Invention

According to the power generation system and the method for activating a fuel cell in a power generation system of the present invention, upon the fuel cell being activated, the on-off valve of the second compressed air supply line is opened, and the degree of opening of the inlet guide vane of the gas turbine compressor is increased from a reference degree of opening, so it is possible to suppress the air shortage in the gas turbine, thereby enabling stable activation.

Also, according to the power generation system and the method for activating a fuel cell in a power generation system of the present invention, the compressed air supply unit is provided connected to the fuel cell side, and upon the fuel cell being activated, the compressed air supply unit is driven and compressed air is supplied independently of the gas turbine, so it is possible to suppress air shortage in the gas turbine, thereby enabling stable activation.

DETAILED DESCRIPTION OF THE INVENTION

The following is a detailed description of the preferred embodiments of a power generation system and a method for activating a fuel cell in a power generation system according to the present invention, with reference to the attached drawings. The present invention is not limited by these embodiments, and, when there is a plurality of embodiments, configurations that combine these embodiments are also included.

First Embodiment

The power generation system according to a first embodiment is a triple combined cycle (registered trademark) that combines a solid oxide fuel cell (hereinafter, referred to as SOFC), a gas turbine, and a steam turbine. The triple combined cycle can generate power in the three stages of the SOFC, the gas turbine, and the steam turbine by installing the SOFC on the upstream side of a gas turbine combined cycle power generation system (GTCC), so it is possible to achieve extremely high power generation efficiency. Note that in the following description, a solid oxide fuel cell is described as the fuel cell in the present invention, but the present invention is not limited to this format of fuel cell.

Figure 1:
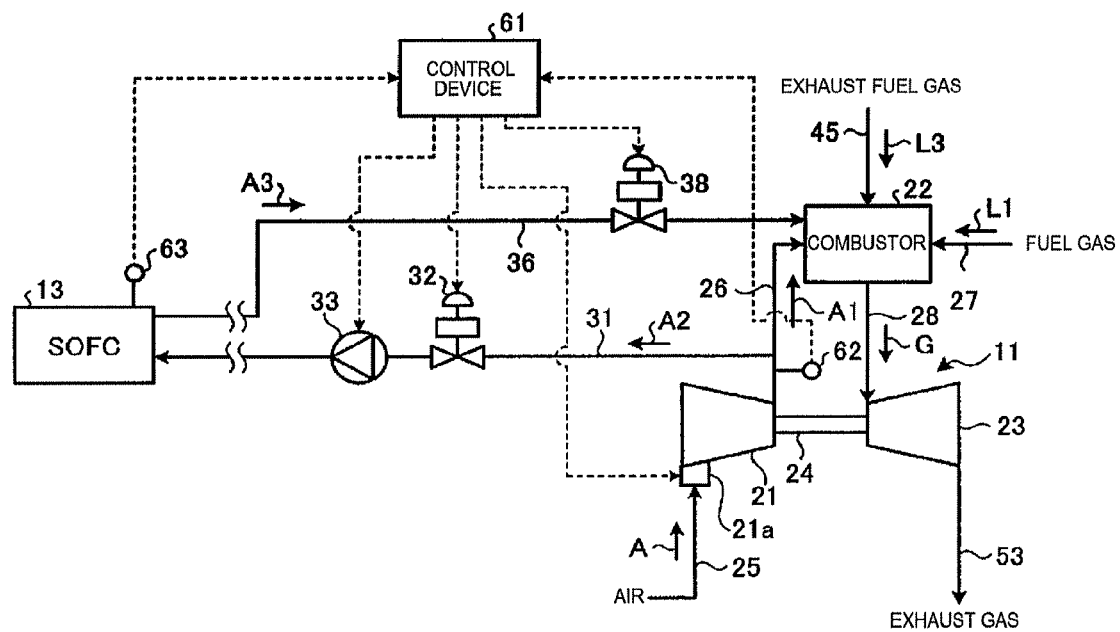
FIG. 1 is a schematic view illustrating a compressed air supply line in a power generation system according to a first embodiment of the present invention.
Figure 2:
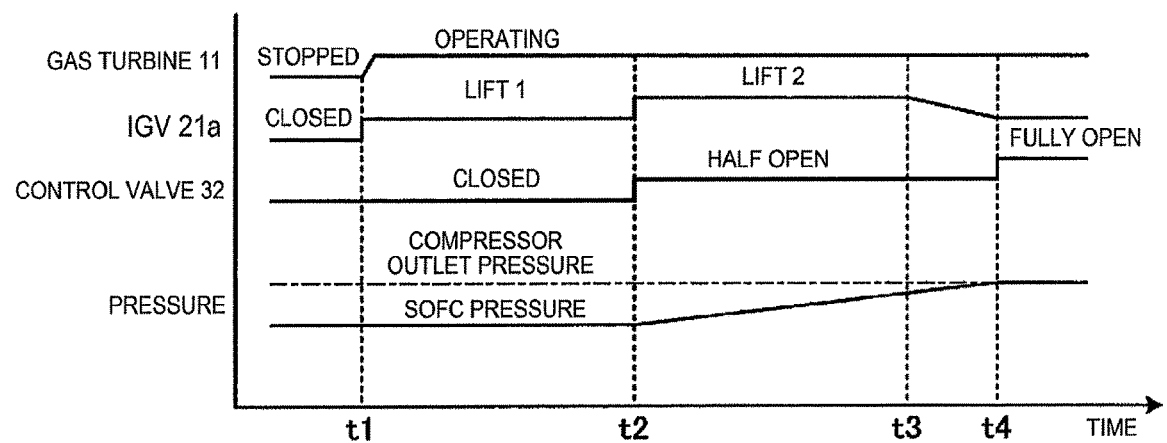
FIG. 2 is a time chart showing the timing of supply of compressed air during pressurization of the SOFC in the power generation system according to the first embodiment.
Figure 3:
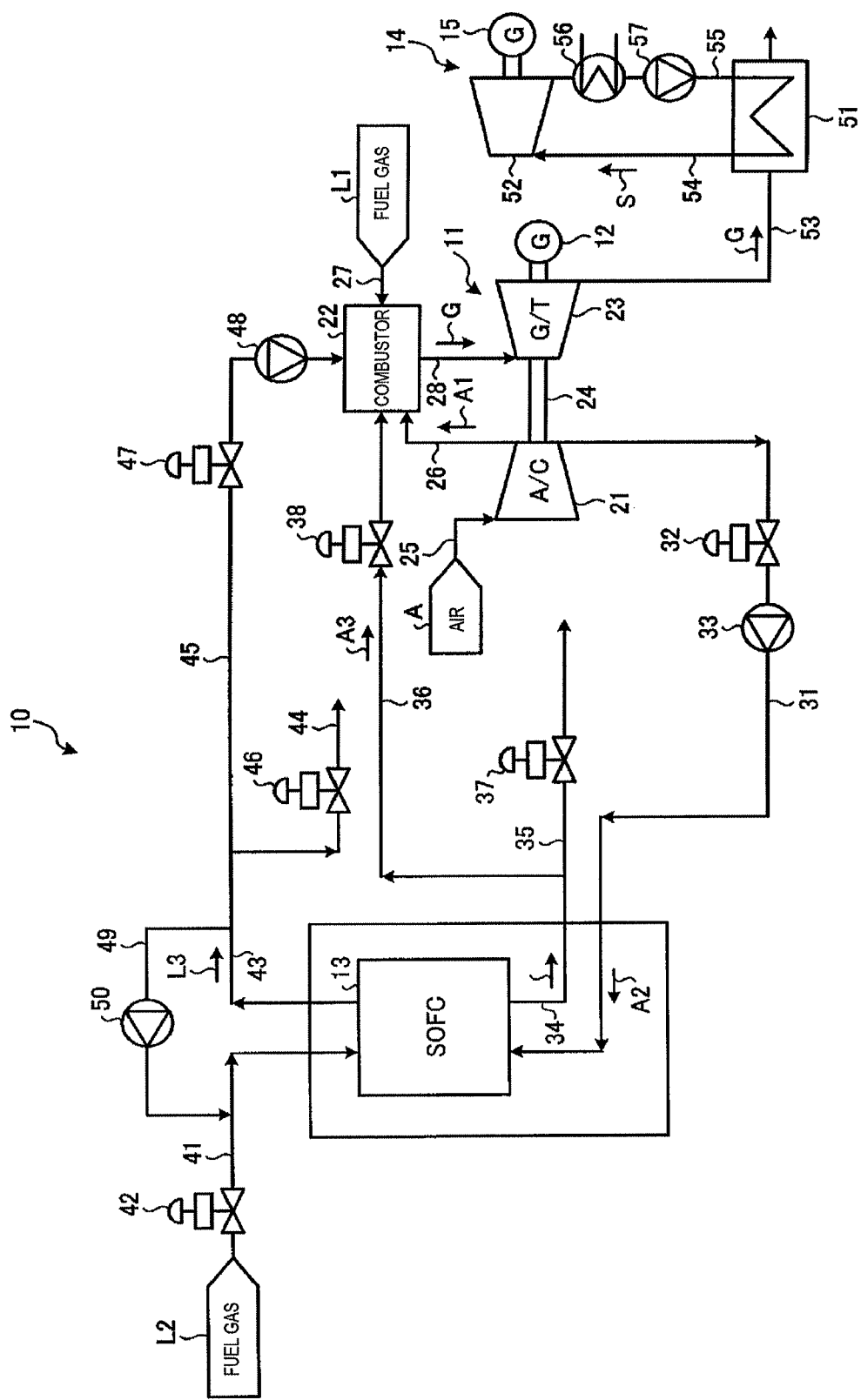
FIG. 3 is a schematic view illustrating the power generation system according to the first embodiment.

FIG. 1 is a schematic view illustrating the compressed air supply line in the power generation system according to the first embodiment of the present invention, FIG. 2 is a time chart showing the timing of supply of compressed air during pressurization of the SOFC in the power generation system according to the first embodiment, and FIG. 3 is a schematic configuration view illustrating the power generation system according to the first embodiment.

As illustrated in FIG. 3, in the first embodiment, a power generation system 10 includes a gas turbine 11, a generator 12, an SOFC 13, a steam turbine 14, and a generator 15. The power generation system 10 is configured to achieve high power generation efficiency by combining the power generation by the gas turbine 11, the power generation by the SOFC 13, and the power generation by the steam turbine 14.

The gas turbine 11 includes a compressor 21, a combustor 22, and a turbine 23, and the compressor 21 and the turbine 23 are connected by a rotary shaft 24 so that they rotate integrally. The compressor 21 compresses air A that is drawn in from an air intake line 25. The combustor 22 mixes and burns compressed air A1 that is supplied from the compressor 21 through a first compressed air supply line 26, and fuel gas L1 that is supplied from a first fuel gas supply line 27.

The turbine 23 is rotated by exhaust gas (combustion gas) G supplied from the combustor 22 via an exhaust gas supply line 28. Although not illustrated on the drawings, the compressed air A1 compressed by the compressor 21 is supplied to the casing of the turbine 23, and the compressed air A1 cools the blades and the like as cooling air. The generator 12 is provided coaxially with the turbine 23, and can generate power by the rotation of the turbine 23. Note that here, for example, liquefied natural gas (LNG) is used as the fuel gas L1 supplied to the combustor 22.

By supplying the high-temperature fuel gas as a reducing agent and high-temperature air (oxidant gas) as an oxidizing agent to the SOFC 13, power is generated by reaction at a predetermined operating temperature. The SOFC 13 is configured from an air electrode, a solid electrolyte, and a fuel electrode, housed within a pressure vessel. Power is generated by supplying a portion of the compressed air A2 compressed by the compressor 21 to the air electrode, and supplying fuel gas to the fuel electrode. Note that here, for example, hydrocarbon gas such as liquefied natural gas (LNG), hydrogen ($H_2$) and carbon monoxide (CO), methane ($CH_4$) or gas produced from a carbon raw material such as coal in a gasification plant is used as fuel gas L2 supplied to the SOFC 13. Also, the oxidant gas supplied to the SOFC 13 is gas that includes about 15% to 30% oxygen, and typically air is ideal, but apart from air, a gas mixture of combustion exhaust gas and air, or a gas mixture of oxygen and air can be used (hereinafter, the oxidant gas supplied to the SOFC 13 is referred to as air).

The SOFC 13 is connected to a second compressed air supply line 31 that branches from the first compressed air supply line 26, to enable a portion of the compressed air A2 compressed by the compressor 21 to be supplied to the inlet of the air electrode. A control valve 32 that can adjust the flow rate of the air supplied, and a blower (pressure booster) 33 that can increase the pressure of the compressed air A2 are provided along the air flow direction on the second compressed air supply line 31. The control valve 32 is provided on the upstream side in the air flow direction in the second compressed air supply line 31, and the blower 33 is provided on the downstream side of the control valve 32. An exhaust air line 34 into which exhaust air A3 that was used at the air electrode is discharged is connected to the SOFC 13. The exhaust air line 34 branches into an exhaust line 35 that discharges to the outside exhaust air A3 that was used at the air electrode, and a compressed air circulation line 36 that is connected to the combustor 22. A control valve 37 that can adjust the flow rate of the air discharged is provided on the exhaust line 35, and a control valve 38 that can adjust the flow rate of the circulating air is provided on the compressed air circulation line 36.

Also, a second fuel gas supply line 41 is provided on the SOFC 13 to supply the fuel gas L2 to the inlet of the fuel electrode. A control valve 42 that can adjust the supplied fuel gas flow rate is provided on the second fuel gas supply line 41. The SOFC 13 is connected to an exhaust fuel line 43 in which exhaust fuel gas L3 that was used at the fuel electrode is discharged. The exhaust fuel line 43 branches into an exhaust line 44 that discharges to the outside, and an exhaust fuel gas supply line 45 connected to the combustor 22. A control valve 46 that can adjust the flow rate of the fuel gas discharged is provided on the exhaust line 44, and a control valve 47 that can adjust the flow rate of the fuel gas supplied and a blower 48 that can increase the pressure of the fuel are provided on the exhaust fuel gas supply line 45 along the flow direction of the exhaust fuel gas L3. The control valve 47 is provided on the upstream side in the flow direction of the exhaust fuel gas L3 in the exhaust fuel gas supply line 45, and the blower is provided on the downstream side of the control valve 47.

Also, a fuel gas recirculation line 49 is provided on the SOFC 13 connecting the exhaust fuel line 43 and the second fuel gas supply line 41. A recirculation blower 50 that recirculates the exhaust fuel gas L3 of the exhaust fuel line 43 to the second fuel gas supply line 41 is provided on the fuel gas recirculation line 49.

A turbine 52 of the steam turbine 14 is rotated by steam generated by an exhaust heat recovery boiler 51 (HRSG). The exhaust heat recovery boiler 51 is connected to an exhaust gas line 53 from the gas turbine 11 (turbine 23), and generates steam S by heat exchange between air and high-temperature exhaust gas G. A steam supply line 54 and a water supply line 55 are provided between the steam turbine 14 (turbine 52) and the exhaust heat recovery boiler 51. A condenser 56 and a water supply pump 57 are provided on the water supply line 55. The generator 15 is provided coaxially with the turbine 52, and can generate power by the rotation of the turbine 52. The exhaust gas from which the heat has been recovered in the exhaust heat recovery boiler 51 is discharged to the atmosphere after removal of harmful substances.

The following is a description of the operation of the power generation system 10 according to the first embodiment. When the power generation system 10 is activated, the gas turbine 11, the steam turbine 14, and the SOFC 13 are activated in that order.

First, in the gas turbine 11, the compressor 21 compresses the air A, and the combustor 22 mixes and burns the compressed air A1 and the fuel gas L1, the turbine 23 is rotated by the exhaust gas G, and the generator 12 starts to generate power. Next, in the steam turbine 14, the turbine 52 is rotated by the steam S generated by the exhaust heat recovery boiler 51, and, as a result, the generator 15 starts to generate power.

Next, the SOFC 13 is pressurized in order to activate the SOFC 13. In order to pressurize the SOFC 13, first the compressed air A2 is supplied to the SOFC 13 to start pressurization and to start heating. The control valve 37 of the exhaust line 35 and the control valve 38 of the compressed air circulation line 36 are closed, and the control valve 32 is opened by a predetermined degree of opening while the blower 33 of the second compressed air supply line 31 is stopped. Then, a portion of the compressed air A2 compressed by the compressor 21 is supplied to the SOFC 13 side from the second compressed air supply line 31. In this way, the pressure on the SOFC 13 side increases due to the supply of the compressed air A2.

On the other hand, in the SOFC 13, the fuel gas L2 is supplied to the fuel electrode side and the pressure starts to rise. With the control valve 46 of the exhaust line 44 and the control valve 47 of the exhaust fuel gas supply line 45 closed, and the blower 48 stopped, the control valve 42 of the second fuel gas supply line 41 is opened, and the recirculation blower 50 of the fuel gas recirculation line 49 is driven. Then, the fuel gas L2 is supplied to the SOFC 13 side from the second fuel gas supply line 41, and the exhaust fuel gas L3 is recirculated by the fuel gas recirculation line 49. In this way, the pressure on the SOFC 13 side increases due to the supply of the fuel gas L2.

Then, when the pressure on the air electrode side of the SOFC 13 reaches the outlet pressure of the compressor 21, the control valve 32 is fully opened, and the blower 33 is driven. At the same time, the control valve 37 is opened and the exhaust air A3 from the SOFC 13 is discharged from the exhaust line 35. Then, the pressure of the compressed air A2 is increased by the blower 33 and supplied to the SOFC 13 side. At the same time, the control valve 46 is opened and the exhaust fuel gas L3 from the SOFC 13 is discharged from the exhaust line 44. Then, when the pressure of the air electrode side and the pressure of the fuel electrode side of the SOFC 13 reach the target pressure, pressurization of the SOFC 13 is completed.

Then, when the reaction (power generation) of the SOFC 13 is stable and the components of the exhaust air A3 and the exhaust fuel gas L3 are stable, the control valve 37 is closed, and the control valve 38 is opened. Then, the exhaust air A3 from the SOFC 13 is supplied to the combustor 22 from the compressed air circulation line 36. Also, the control valve 46 is closed, the control valve 47 is opened, and the blower 48 is driven. Then, the exhaust fuel gas L3 from the SOFC 13 is supplied to the combustor 22 from the exhaust fuel gas supply line 45. At this time, the flow rate of the fuel gas L1 supplied to the combustor 22 from the first fuel gas supply line 27 is reduced.

At this stage, the power generation by the generator 12 due to the driving of the gas turbine 11, the power generation by the SOFC 13, and the power generation by the generator 15 due to the driving of the steam turbine 14 are all activated, so the power generation system 10 operates at steady-state.

In a normal power generation system, when the SOFC 13 is activated, the SOFC 13 is pressurized by supplying a portion of the air compressed by the compressor 21 of the gas turbine 11 to the SOFC 13 from the second compressed air supply line 31. Therefore, until pressurization of the SOFC 13 is completed, in the gas turbine 11, there is a possibility that the compressed air supplied to the combustor 22 and the cooling air delivered to the turbine 23 will be insufficient.

Therefore, in the power generation system 10 according to the first embodiment, an inlet guide vane (IGV) 21a is provided at the air intake port of the compressor 21 of the gas turbine 11, so when pressurizing the SOFC 13, a control device (control unit) 61 opens the control valve (on-off valve) 32 on the second compressed air supply line 31, and controls the degree of opening of the inlet guide vane 21a to be greater than a predetermined reference degree of opening.

In other words, when pressurizing the SOFC 13, by increasing the degree of opening of the inlet guide vane 21a in the compressor 21, the quantity of compressed air generated by the compressor 21 is increased, to ensure the quantity of compressed air delivered to the combustor 22 and turbine 23, as well as to ensure the quantity of compressed air delivered to the SOFC 13. Therefore, it is possible to suppress the air shortage in the gas turbine 11.

Describing in detail, as illustrated in FIG. 1, in the gas turbine 11, the fuel gas and the air flow rate necessary for combustion of the combustor 22 are set in accordance with the power generation load, and the air flow rate necessary for cooling the high-temperature components of the turbine 23 is set. When the reference air flow rate necessary for the combustor 22 and the turbine 23 are set, the reference degree of opening of the inlet guide vane 21a is set in accordance with this reference air flow rate. On the other hand, the control valve 32 on the second compressed air supply line 31 can adjust the flow rate.

Also, as illustrated in FIG. 1, a first sensor 62 is provided on the first compressed air supply line 26. The first sensor 62 measures a first pressure of the compressed air compressed by the compressor 21 of the gas turbine 11. Also, a second sensor 63 is provided on the SOFC 13. The second sensor 63 measures a second pressure of the air electrode of the SOFC 13, in other words, the pressure on the SOFC 13 side from the control valve 32 on the second compressed air supply line 31. The sensors 62, 63 output the measured first pressure and second pressure to the control device 61.

When pressurization of the SOFC 13 starts, the control device 61 controls the control valve 32 to open to an initial degree of opening (for example, half open) that is smaller than the fully open state. Together with this control, the control device 61 controls the degree of opening of the inlet guide vane 21a to a predetermined degree of opening that is greater than the reference degree of opening during steady-state operation of the gas turbine, so that the first pressure measured by the first sensor 62 is equal to a reference pressure in accordance with the reference air flow rate in the gas turbine 11. Therefore, in the compressor 21, compressed air is generated that is greater than the reference air flow rate necessary for the combustor 22 and the turbine 23.

Also, as the second pressure measured by the second sensor 63 approaches the first pressure measured by the first sensor 62, the control device 61 controls the degree of opening of the inlet guide vane 21a to gradually restore to the reference degree of opening from the predetermined degree of opening that is greater than the reference degree of opening. Then, when the second pressure measured by the second sensor 63 reaches the first pressure measured by the first sensor 62, the control device 61 controls the degree of opening of the control valve 32 to increase it to a predetermined degree of opening (for example, fully open) from the initial degree of opening (for example, half open).

In other words, as pressurization of the SOFC 13 progresses and the second pressure approaches the first pressure, the degree of opening of the inlet guide vane 21a is gradually reduced, so the flow rate of compressed air generated in the compressor 21 is gradually reduced to the reference air flow rate. Then, when the second pressure reaches the first pressure and pressurization of the SOFC 13 is complete, the control valve 32 is fully opened, and the degree of opening of the inlet guide vane 21a is restored to the reference degree of opening from the predetermined degree of opening which is greater than the reference degree of opening, so the flow rate of compressed air generated in the compressor 21 is restored to the reference air flow rate.

Here, the method for activating the SOFC 13 in the power generation system 10 according to the first embodiment as described above is described.

The method for activating the SOFC 13 in the power generation system 10 according to the first embodiment includes the steps of: supplying compressed air compressed by the compressor 21 of the gas turbine 11 to the combustor 22; supplying a portion of the compressed air compressed by the compressor 21 to the air electrode of the SOFC 13; increasing the degree of opening of the inlet guide vane 21a provided at the air intake port of the compressor 21 from a preset reference degree of opening; and restoring the degree of opening of the inlet guide vane 21a to the reference degree of opening when the pressure of the air electrode side reaches the pressure of the compressed air compressed by the compressor 21.

In other words, as shown in FIG. 2, at time t1, the gas turbine 11 is activated and after a predetermined amount of time has passed, at time t2, pressurization of the SOFC 13 is started. At time t1, at the same time as activation of the gas turbine 11, the inlet guide vane 21a is opened to the reference degree of opening (degree of opening 1) in accordance with the operating state of the gas turbine 11. Then, at time t2, at the same time as pressurization of the SOFC 13 starts, the control valve 32 is opened to an initial opening (for example, half open), and the degree of opening of the inlet guide vane 21a is opened to a predetermined degree of opening (degree of opening 2) that is greater than the reference degree of opening.

Then, in the gas turbine 11, the quantity of air A compressed by the compressor 21 is increased, and the air A1 at the reference air flow rate flows from the compressor 21 to the combustor 22 and the turbine 23, and the outlet pressure (first pressure) of the compressor 21 is maintained at a predetermined pressure without dropping. On the other hand, in the SOFC 13, the compressed air A2 which is a portion of the air compressed by the compressor 21 flows to the SOFC 13 via the second compressed air supply line 31, so the pressure of the SOFC 13 (second pressure) gradually increases.

Then, at time t3, when the second pressure approaches the first pressure, the degree of opening of the inlet guide vane 21a is reduced toward the reference degree of opening and the flow rate of compressed air supplied to the SOFC 13 is reduced. In this case, a predetermined third pressure that is lower than the first pressure by a predetermined amount may be set in advance, and when the second pressure reaches the third pressure, the flow rate of compressed air supplied to the SOFC 13 may be reduced. Then, at time t4, when the second pressure reaches the first pressure, the degree of opening of the inlet guide vane 21a is made to equal to the reference degree of opening (degree of opening 1), and the control valve 32 is opened (for example, fully opened).

Then, pressurization of the SOFC 13 by the supply of the compressed air is completed, and the blower 33 is driven as the control valve 32 is fully open, so the pressure of the compressed air A2 is increased by the blower 33 and supplied to the SOFC 13 side. Therefore, the pressure of the air electrode side of the SOFC 13 is further increased, and the pressure is increased up to the target pressure.

In this way, the power generation system according to the first embodiment includes the gas turbine 11 having the compressor 21, the combustor 22, and the turbine 23; the inlet guide vane 21a provided at the air intake port of the compressor 21; the first compressed air supply line 26 for supplying compressed air compressed by the compressor 21 to the combustor 22; the SOFC 13 having the air electrode and the fuel electrode; the second compressed air supply line 31 for supplying at least a portion of the compressed air compressed by the compressor 21 to the air electrode; the control valve 32 provided on the second compressed air supply line 31; and the control device 61 for opening the control valve 32 when the SOFC 13 is being pressurized and increasing the degree of opening of the inlet guide vane 21a from the preset reference degree of opening.

Therefore, when pressurization of the SOFC 13 is started, the control valve 32 of the second compressed air supply line 31 is opened, and the degree of opening of the inlet guide vane 21a is increased from the reference degree of opening. Then, the compressor 21 intakes and compresses more air, so the flow rate of the compressed air generated increases. Then, the reference air flow rate necessary for the combustor 22 and the turbine 23 is delivered from the total quantity of the compressed air generated, and the remainder of the compressed air is delivered to the SOFC 13. Therefore, at this time, there is no shortage of compressed air in the combustor 22 and the turbine 23, so it is possible to suppress faulty combustion in the combustor 22 and insufficient cooling in the turbine 23. As a result, the air shortage in the gas turbine 11 is suppressed, so it is possible to enable the SOFC 13 while stably operating the gas turbine 11.

In the power generation system according to the first embodiment, the control valve 32 that can adjust the flow rate is provided, and when the SOFC 13 is being pressurized, the control device 61 opens the control valve 32 to the initial degree of opening that is smaller than the fully open state, and opens the degree of opening of the inlet guide vane 21a to the predetermined degree of opening that is greater than that of during the steady-state operation of the gas turbine 11. Therefore, when the SOFC 13 is being pressurized, by only adjusting the degree of opening of the single control valve 32 provided on the second compressed air supply line 31, it is possible to adjust the flow rate of compressed air supplied to the SOFC 13, so it is possible to simplify the structure and reduce the cost.

In the power generation system according to the first embodiment, the first sensor 62 that measures the first pressure of the compressed air compressed by the compressor 21 and the second sensor 63 that measures the second pressure of the SOFC 13 are provided, and when the second pressure reaches the first pressure, the control device 61 increases the degree of opening of the control valve 32, and restores the degree of opening of the inlet guide vane 21a to the reference degree of opening. Therefore, when pressurization of the SOFC 13 is completed, by restoring the degree of opening of the inlet guide vane 21a to the reference degree of opening, the flow rate compressed air supplied to the combustor 22 and the turbine 23 can be maintained constant.

In the power generation system according to the first embodiment, as the second pressure approaches the first pressure, the control device 61 reduces the degree of opening of the inlet guide vane 21a toward the reference degree of opening. Therefore, by gradually reducing the flow rate of compressed air supplied to the SOFC 13, it is possible to make the second pressure equal to the first pressure with a high degree of accuracy, so it is possible to control the supply of compressed air to a high degree of accuracy.

Also, the method for activating the SOFC 13 in the power generation system according to the first embodiment includes the steps of: supplying compressed air compressed by the compressor 21 of the gas turbine 11 to the combustor 22; supplying compressed air compressed by the compressor 21 to the air electrode of the SOFC 13; increasing the degree of opening of the inlet guide vane 21a of the compressor 21 from a preset reference degree of opening; and increasing the degree of opening of the control valve 32 and of restoring the degree of opening of the inlet guide vane 21a to the reference degree of opening when the pressure of the air electrode side reaches the pressure of the compressed air compressed by the compressor 21.

Therefore, when pressurization of the SOFC 13 is started, there is no shortage of compressed air in the combustor 22 or the turbine 23, so an air shortage in the gas turbine 11 is suppressed, and it is possible to stably pressurize the SOFC 13 while stably operating the gas turbine 11. Note that the system is configured so that a portion of the compressed air compressed by the compressor 21 is supplied to the air electrode of the SOFC 13, but all of the compressed air compressed by the compressor 21 may be supplied to the air electrode of the SOFC 13.

Second Embodiment

Figure 4:
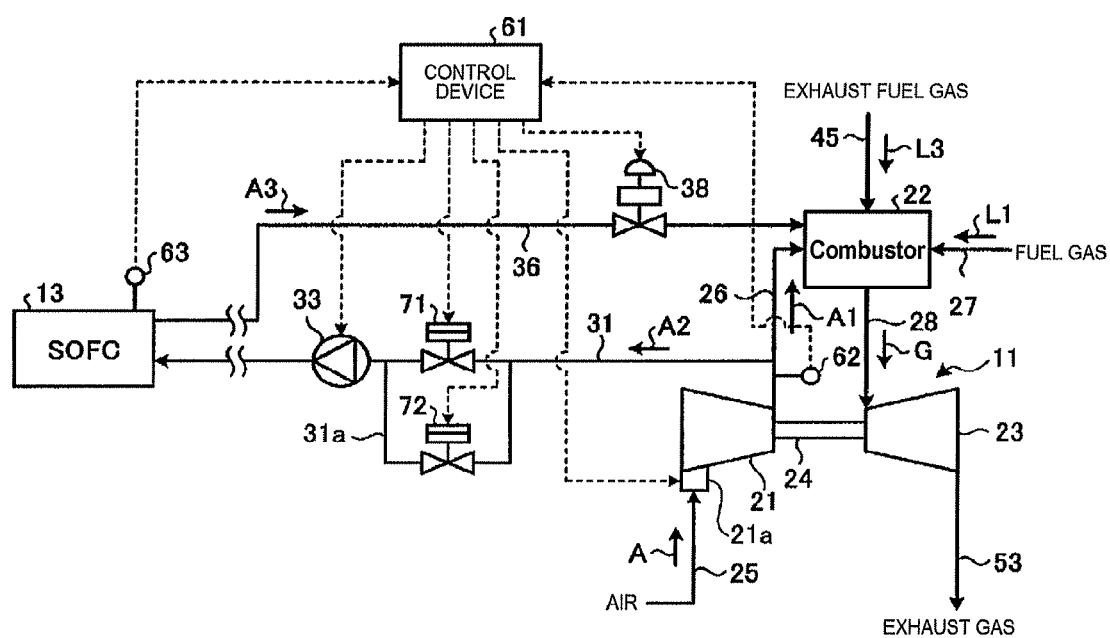
FIG. 4 is a schematic view illustrating a compressed air supply line in a power generation system according to a second embodiment of the present invention.
Figure 5:
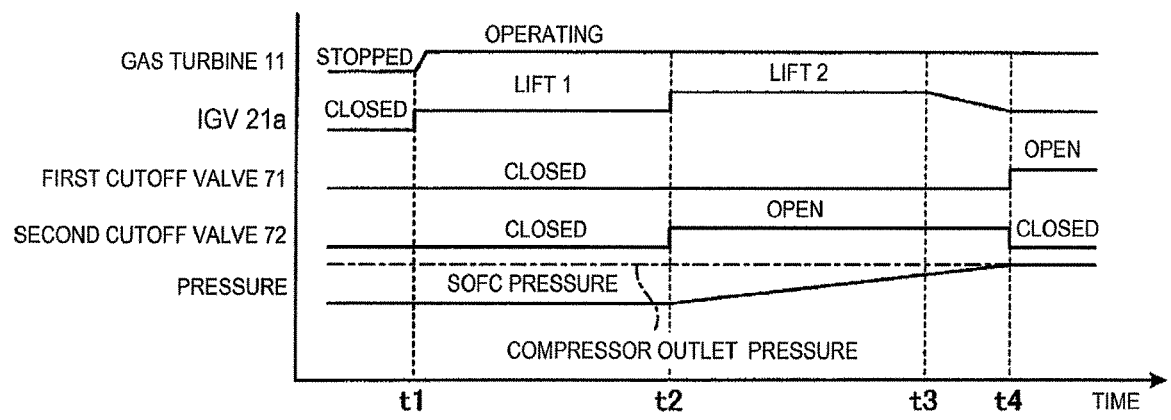
FIG. 5 is a time chart showing the timing of supply of compressed air during pressurization of the SOFC in the power generation system according to the second embodiment.

FIG. 4 is a schematic view illustrating a compressed air supply line in a power generation system according to a second embodiment of the present invention, and FIG. 5 is a time chart showing the timing of supply of compressed air during pressurization of an SOFC in the power generation system according to the second embodiment. Note that members having the same function as the embodiment described above are given the same reference numerals, and their detailed descriptions are omitted.

In the power generation system according to the second embodiment, a first cutoff valve (first on-off valve) 71 that passes a large flow rate when open, and a second cutoff valve (second on-off valve) 72 that passes a small flow rate when open are provided in parallel on the second compressed air supply line 31 as the on-off valve of the present invention. In other words, the first cutoff valve 71 is provided on the second compressed air supply line 31, and the second cutoff valve 72 is provided on a bypass route 31a of the first cutoff valve 71 on the second compressed air supply line 31. When the SOFC 13 is being pressurized, the control device 61 closes the first cutoff valve 71 and opens the second cutoff valve 72, and opens the degree of opening of the inlet guide vane 21a to the predetermined degree of opening that is greater than that during steady-state operation of the gas turbine 11. In this case, the first cutoff valve 71 and the second cutoff valve (second on-off valve) 72 are set so that the flow rate of compressed air passing through the first cutoff valve 71 when fully open is greater than the flow rate of compressed air passing through the second cutoff valve 72 when fully open.

In other words, when the SOFC 13 is being pressurized, by increasing the degree of opening of the inlet guide vane 21a in the compressor 21, the flow rate of compressed air generated by the compressor 21 is increased, so the flow rate of compressed air delivered to the combustor 22 and the turbine 23 is ensured, and the flow rate of compressed air delivered to the SOFC 13 is ensured. Therefore, it is possible to suppress the air shortage in the gas turbine 11.

Describing in detail, as illustrated in FIG. 4, in the gas turbine 11, the air flow rate to the combustor 22 necessary for combustion in association with the fuel gas is set in accordance with the power generation load, and the air flow rate to the turbine 23 necessary for cooling the high-temperature parts is set. When the reference air flow rate necessary for the combustor 22 and the turbine 23 are set, the reference degree of opening of the inlet guide vane 21a is set in accordance with this reference air flow rate. On the other hand, on the second compressed air supply line 31, the two cutoff valves 71, 72 that pass different flow rates of compressed air when fully open are provided in parallel. When the SOFC 13 is being pressurized, the control device 61 controls the second cutoff valve 72 that passes a small flow rate to be only open, and controls the degree of opening of the inlet guide vane 21a to be a predetermined degree of opening that is greater than the reference degree of opening during steady-state operation of the gas turbine.

Also, when the second pressure measured by the second sensor 63 reaches the first pressure measured by the first sensor 62, the control device 61 closes the second cutoff valve 72 and opens the first cutoff valve 71, and controls the degree of opening of the inlet guide vane 21a to restore to the reference degree of opening from the predetermined degree of opening that is greater than the reference degree of opening.

Here, a method for activating the SOFC 13 in the power generation system according to the second embodiment as described above is described.

As shown in FIG. 5, at time t1, the gas turbine 11 is activated and after predetermined amount of time has passed, and at time t2, pressurization of the SOFC 13 starts. At time t1, at the same time as activation of the gas turbine 11, the inlet guide vane 21a is opened to the reference degree of opening (degree of opening 1) in accordance with the operating state of the gas turbine 11. Also, at time t2, at the same time as pressurization of the SOFC 13 starts, the second cutoff valve 72 is opened and the degree of opening of the inlet guide vane 21a is opened to the predetermined degree of opening (degree of opening 2) that is greater than the reference degree of opening.

Then, in the gas turbine 11, the quantity of air A compressed by the compressor 21 is increased, and the air A1 at the reference air flow rate flows from the compressor 21 to the combustor 22 and the turbine 23, and the outlet pressure (first pressure) of the compressor 21 is maintained as a predetermined pressure without dropping. On the other hand, in the SOFC 13, the compressed air A2 that is a portion of the air compressed by the compressor 21 flows to the SOFC 13 through the second compressed air supply line, so the pressure of the SOFC 13 (second pressure) gradually increases.

At time t3, when the second pressure approaches the first pressure, the degree of opening of the inlet guide vane 21a is reduced toward the reference degree of opening and the flow rate of compressed air supplied to the SOFC 13 is reduced. Then, at time t4, when the second pressure reaches the first pressure, the degree of opening of the inlet guide vane 21a is made to equal to the reference degree of opening (degree of opening 1), the first cutoff valve 71 is opened and the second cutoff valve 72 is closed. Then, pressurization of the SOFC 13 by the supply of the compressed air is completed, the first cutoff valve 71 is opened and the blower 33 is driven, so the pressure of the compressed air A2 is increased by the blower 33 and supplied to the SOFC 13 side. Therefore, the pressure of the air electrode side of the SOFC 13 is further increased, and the pressure is increased up to the target pressure.

In this way, the power generation system according to the second embodiment includes the gas turbine 11 having the compressor 21, the combustor 22, and the turbine 23; the inlet guide vane 21a provided at the air intake port of the compressor 21; the first compressed air supply line 26 for supplying compressed air compressed by the compressor 21 to the combustor 22; the SOFC 13 having the air electrode and the fuel electrode; the second compressed air supply line 31 for supplying at least a portion of the compressed air compressed by the compressor 21 to the air electrode; the first and second cutoff values 71, 72 having different passing flow rates provided in parallel on the second compressed air supply line 31; and the control device 61 for opening only the second cutoff valve 72 that passes a small flow rate when the SOFC 13 is activated and increasing the degree of opening of the inlet guide vane 21a from the preset reference degree of opening.

Therefore, when pressurization of the SOFC 13 is started, the second cutoff valve 72 of the second compressed air supply line 31 is opened, and the degree of opening of the inlet guide vane 21a of the compressor 21 is increased from the reference degree of opening. Then, the compressor 21 intakes and compresses more air, so the flow rate of the compressed air generated increases. Then, the reference air flow rate necessary for the combustor 22 and the turbine 23 is delivered from the total quantity of the compressed air generated, and the remainder of the compressed air is delivered to the SOFC 13. Therefore, at this time, there is no shortage of compressed air in the combustor 22 and the turbine 23, so it is possible to suppress faulty combustion in the combustor 22 and insufficient cooling in the turbine 23. As a result, the air shortage in the gas turbine 11 is suppressed, so the gas turbine 11 operates stably, and it is possible to stably activate the SOFC 13.

In the power generation system according to the second embodiment, the first cutoff valve 71 that passes a large flow rate when open and the second cutoff valve 72 that passes a small flow rate are provided in parallel, and during pressurization of the SOFC 13, the control device 61 closes the first cutoff valve 71 and opens the second cutoff valve 72, and opens the degree of opening of the inlet guide vane 21a to the predetermined degree of opening that is greater than that during steady-state operation of the gas turbine. Therefore, by providing the two cutoff valves 71, 72 that pass different flow rates on the second compressed air supply line 31, by simply opening or closing each of the cutoff valves 71, 72, it is possible to adjust the flow rate of the compressed air supplied to the SOFC 13, so flow rate control is simplified and it is possible to reduce the cost, and it is possible to rapidly switch the flow rate control.

Third Embodiment

A power generation system according to a third embodiment is a triple combined cycle (registered trademark) that combines a solid oxide fuel cell (hereinafter, referred to as SOFC), a gas turbine, and a steam turbine. The triple combined cycle can produce electricity in the three stages of the SOFC, the gas turbine, and the steam turbine by installing the SOFC on the upstream side of a gas turbine combined cycle power generation system (GTCC), so it is possible to achieve extremely high power generation efficiency. Note that in the following description, a solid oxide fuel cell is described as the fuel cell in the present invention, but the present invention is not limited to this format of fuel cell.

Figure 6:
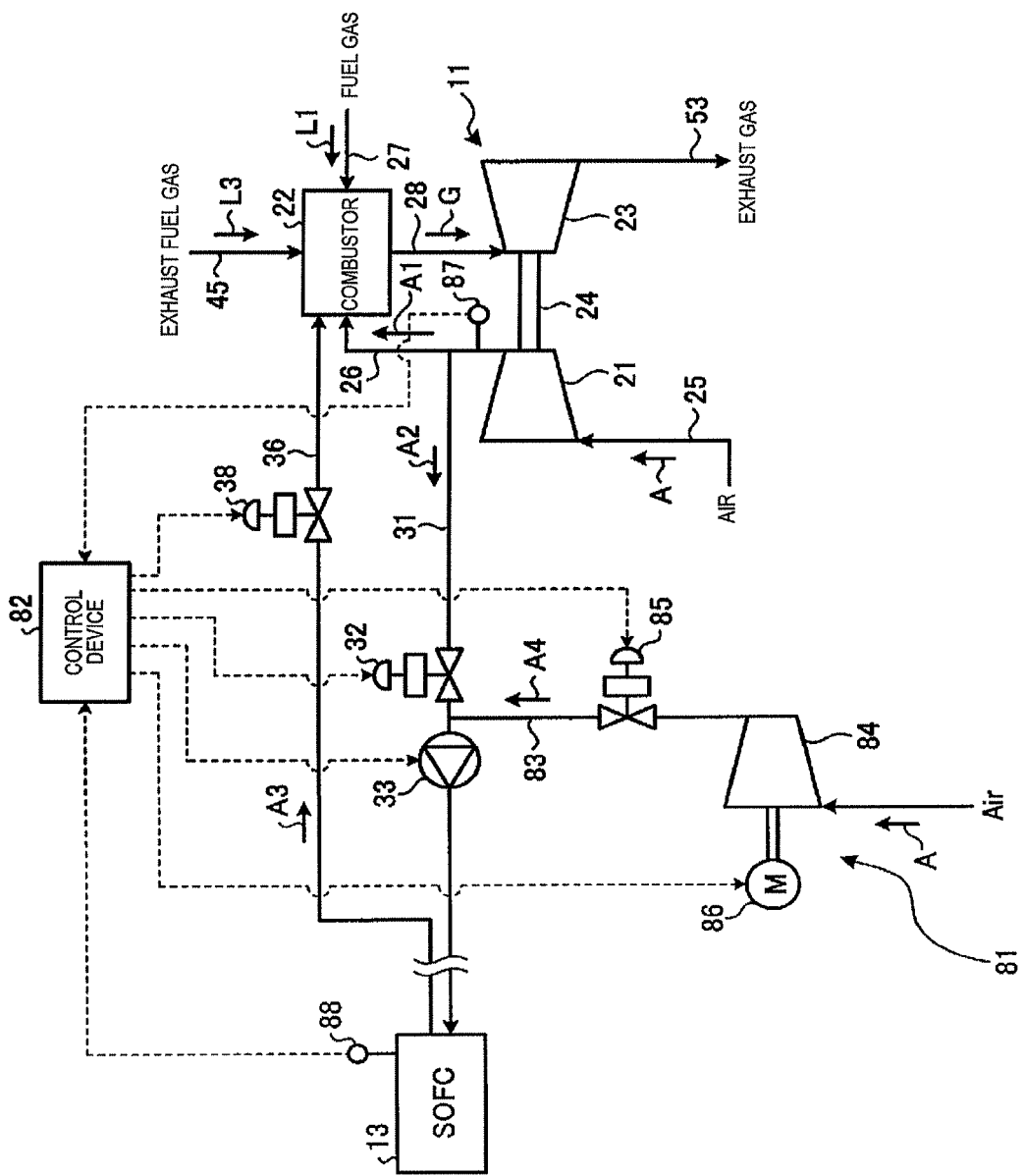
FIG. 6 is a schematic view illustrating a compressed air supply line in a power generation system according to a third embodiment of the present invention.
Figure 7:
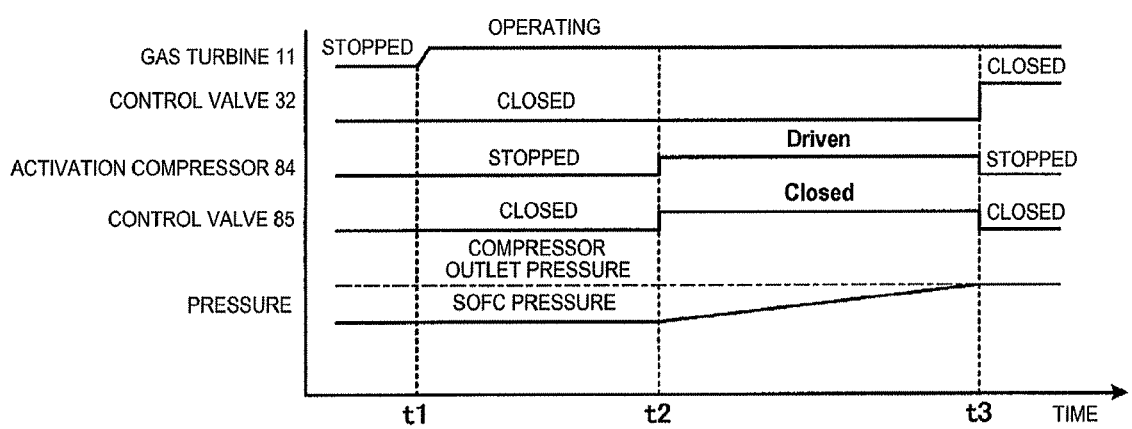
FIG. 7 is a time chart showing the timing of supply of compressed air when the SOFC is activated in the power generation system according to the third embodiment.
Figure 8:
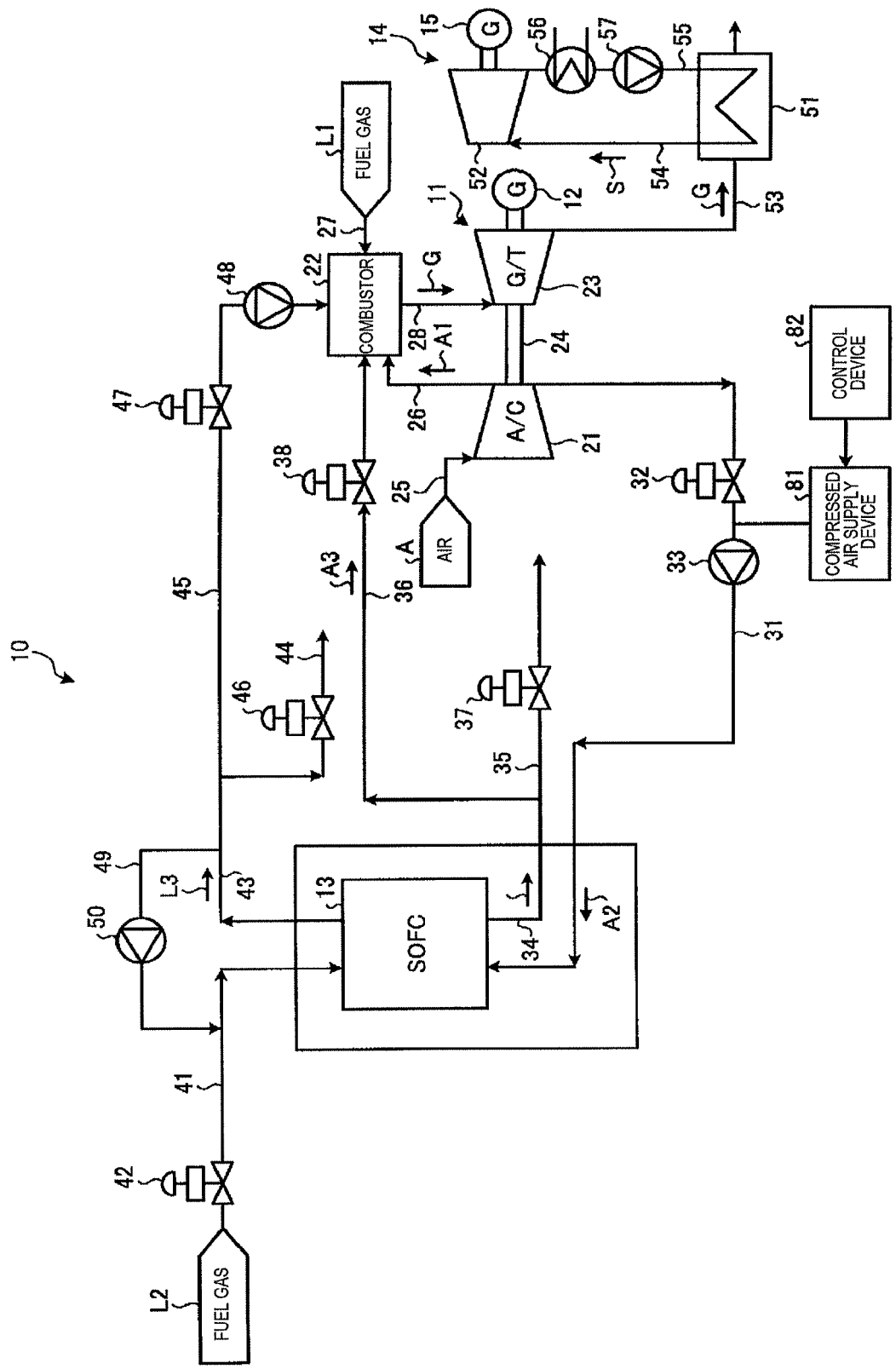
FIG. 8 is a schematic view illustrating a power generation system according to a fourth embodiment.

FIG. 6 is a schematic view illustrating the compressed air supply line in the power generation system according to the third embodiment of the present invention, FIG. 7 is a time chart showing the timing of supply of compressed air when the SOFC is activated in the power generation system according to the third embodiment, and FIG. 8 is a schematic configuration view illustrating the power generation system according to the third embodiment.

As illustrated in FIG. 8, in the third embodiment, the power generation system 10 includes the gas turbine 11, the generator 12, the SOFC 13, the steam turbine 14, and the generator 15. The power generation system 10 is configured to achieve high power generation efficiency by combining the power generation by the gas turbine 11, the power generation by the SOFC 13, and the power generation by the steam turbine 14.

The gas turbine 11 includes the compressor 21, the combustor 22, and the turbine 23, and the compressor 21 and the turbine 23 are connected so that they rotate integrally by the rotary shaft 24. The compressor 21 compresses air A that is drawn in from the air intake line 25. The combustor 22 mixes and burns compressed air A1 supplied from the compressor 21 through the first compressed air supply line 26, and fuel gas L1 supplied from the first fuel gas supply line 27. The turbine 23 is rotated by exhaust gas (combustion gas) G supplied from the combustor 22 via the exhaust gas supply line 28. Although not illustrated on the drawings, the compressed air A1 compressed by the compressor 21 is supplied to the casing of the turbine 23, and the compressed air A1 cools the blades and the like as cooling air. The generator 12 is provided coaxially with the turbine 23, and can generate power by the rotation of the turbine 23. Note that here, for example, liquefied natural gas (LNG) is used as the fuel gas L1 supplied to the combustor 22.

By supplying the high-temperature fuel gas as a reducing agent and high-temperature air (oxidant gas) as an oxidizing agent to the SOFC 13, power is generated by reaction at a predetermined operating temperature. The SOFC 13 is configured from an air electrode, a solid electrolyte, and a fuel electrode housed within a pressure vessel. Power is generated by supplying a portion of the compressed air A2 compressed by the compressor 21 to the air electrode, and supplying fuel gas to the fuel electrode. Note that here for example hydrocarbon gas such as liquefied natural gas (LNG), hydrogen ($H_2$) and carbon monoxide (CO), methane ($CH_4$) or gas produced from a carbon raw material such as coal in a gasification plant is used as fuel gas L2 supplied to the SOFC 13. Also, the oxidant gas supplied to the SOFC 13 is gas that includes about 15% to 30% oxygen, and typically air is ideal, but apart from air, a gas mixture of combustion exhaust gas and air, or a gas mixture of oxygen and air can be used (hereinafter, the oxidant gas supplied to the SOFC 13 is referred to as air).

The SOFC 13 is connected to the second compressed air supply line 31 that branches from the first compressed air supply line 26, to enable a portion of the compressed air A2 compressed by the compressor 21 to be supplied to the inlet of the air electrode. The control valve 32 that can adjust the flow rate of the air supplied, and the blower (pressure booster) 33 that can increase the pressure of the compressed air A2 are provided along the air flow direction on the second compressed air supply line 31. The control valve 32 is provided on the upstream side in the air flow direction in the second compressed air supply line 31, and the blower 33 is provided on the downstream side of the control valve 32. The exhaust air line 34 into which exhaust air A3 that was used at the air electrode is discharged is connected to the SOFC 13. The exhaust air line 34 branches into the exhaust line 35 that discharges to the outside exhaust air A3 that was used at the air electrode, and a compressed air circulation line 36 that is connected to the combustor 22. The control valve 37 that can adjust the air flow rate discharged is provided on the exhaust line 35, and the control valve 38 that can adjust the flow rate of the circulating air is provided on the compressed air circulation line 36.

Also, the second fuel gas supply line 41 is provided on the SOFC 13 to supply the fuel gas L2 to the inlet of the fuel electrode. The control valve 42 that can adjust the supplied fuel gas flow rate is provided on the second fuel gas supply line 41. The SOFC 13 is connected to the exhaust fuel line 43 in which exhaust fuel gas L3 that was used at the fuel electrode is discharged. The exhaust fuel line 43 branches into the exhaust line 44 that discharges to the outside, and the exhaust fuel gas supply line 45 connected to the combustor 22. The control valve 46 that can adjust the fuel gas flow rate discharged is provided on the exhaust line 44, and the control valve 47 that can adjust the fuel gas flow rate supplied and the blower 48 that can increase the pressure of the fuel are provided on the exhaust fuel gas supply line 45 along the flow direction of the exhaust fuel gas L3. The control valve 47 is provided on the upstream side in the flow direction of the exhaust fuel gas L3 in the exhaust fuel gas supply line 45, and the blower is provided on the downstream side of the control valve 47.

Also, the fuel gas recirculation line 49 is provided on the SOFC 13 connecting the exhaust fuel line 43 and the second fuel gas supply line 41. The recirculation blower 50 that recirculates the exhaust fuel gas L3 of the exhaust fuel line 43 to the second fuel gas supply line 41 is provided on the fuel gas recirculation line 49.

The turbine 52 of the steam turbine 14 is rotated by steam generated by the exhaust heat recovery boiler 51 (HRSG). The exhaust heat recovery boiler 51 is connected to the exhaust gas line 53 from the gas turbine 11 (turbine 23), and generates steam S by heat exchange between air and high-temperature exhaust gas G. The steam supply line 54 and the water supply line 55 are provided between the steam turbine 14 (turbine 52) and the exhaust heat recovery boiler 51. The condenser 56 and the water supply pump 57 are provided on the water supply line 55. The generator 15 is provided coaxially with the turbine 52, and can generate power by the rotation of the turbine 52. The exhaust gas from which the heat has been recovered in the exhaust heat recovery boiler 51 is discharged to the atmosphere after removal of harmful substances.

The following is a description of the operation of the power generation system 10 according to the third embodiment. When the power generation system 10 is activated, the gas turbine 11, the steam turbine 14, and the SOFC 13 are activated in that order.

First, in the gas turbine 11, the compressor 21 compresses the air A, and the combustor 22 mixes and burns the compressed air A1 and the fuel gas L1, the turbine 23 is rotated by the exhaust gas G, and the generator 12 starts to generate power. Next, in the steam turbine 14, the turbine 52 is rotated by the steam S generated by the exhaust heat recovery boiler 51, and, as a result, the generator 15 starts to generate power.

Then, in the SOFC 13, first, the compressed air A2 is supplied by a compressed air supply device 81 and the pressure starts to rise. The control valve 37 of the exhaust line 35 and the control valve 38 of the compressed air circulation line 36 are closed, and the control valve 32 is closed while the blower 33 of the second compressed air supply line 31 is stopped. When the compressed air supply device 81 is driven and when a control valve 85 is opened, a portion of the compressed air A2 compressed by the compressed air supply device 81 is supplied to the SOFC 13 side from the second compressed air supply line 31. In this way, the pressure on the SOFC 13 side increases due to the supply of the compressed air A2.

On the other hand, in the SOFC 13, the fuel gas L2 is supplied to the fuel electrode side and the pressure starts to rise. With the control valve 46 of the exhaust line 44 and the control valve 47 of the exhaust fuel gas supply line 45 closed, and the blower 48 stopped, the control valve 42 of the second fuel gas supply line 41 is opened, and the recirculation blower 50 of the fuel gas recirculation line 49 is driven. Then, the fuel gas L2 is supplied to the SOFC 13 side from the second fuel gas supply line 41, and the exhaust fuel gas L3 is recirculated by the fuel gas recirculation line 49. In this way, the pressure of the SOFC 13 side increases due to the supply of the fuel gas L2.

Then, when the pressure of the air electrode side of the SOFC 13 equals to the outlet pressure of the compressor 21, the control valve 32 is opened, the control valve 85 is closed, and the blower 33 is driven. At the same time, the control valve 37 is opened and the exhaust air A3 from the SOFC 13 is discharged from the exhaust line 35. Then, the compressed air A2 is supplied to the SOFC 13 side by the blower 33. At the same time, the control valve 46 is opened and the exhaust fuel gas L3 from the SOFC 13 is discharged from the exhaust line 44. Then, when the pressure of the air electrode side and the pressure of the fuel electrode side of the SOFC 13 reach the target pressure, pressurization of the SOFC 13 is completed.

Then, when the reaction (power generation) of the SOFC 13 is stable and the components of the exhaust air A3 and the exhaust fuel gas L3 are stable, the control valve 37 is closed, and the control valve 38 is opened. Then, the exhaust air A3 from the SOFC 13 is supplied to the combustor 22 from the compressed air circulation line 36. Also, the control valve 46 is closed, the control valve 47 is opened, and the blower 48 is driven. Then, the exhaust fuel gas L3 from the SOFC 13 is supplied to the combustor 22 from the exhaust fuel gas supply line 45. At this time, the flow rate of the fuel gas L1 supplied to the combustor 22 from the first fuel gas supply line 27 is reduced.

At this stage, the power generation by the generator 12 due to the driving of the gas turbine 11, the power generation by the SOFC 13, and the power generation by the generator 15 due to the driving of the steam turbine 14 are all activated, so the power generation system 10 operates at steady-state.

In a normal power generation system, when the SOFC 13 is activated, the SOFC 13 is pressurized by supplying a portion of the air compressed by the compressor 21 of the gas turbine 11 to the SOFC 13 from the second compressed air supply line 31. Therefore, in the gas turbine 11, there is a possibility that the compressed air supplied to the combustor 22 and the cooling air delivered to the turbine 23 will be insufficient.

Therefore, in the power generation system 10 according to the third embodiment, the compressed air supply device (compressed air supply unit) 81 is provided on the second compressed air supply line 31 connected on the SOFC 13 side from the control valve (first on-off valve) 32, and a control device (control unit) 82 closes the control valve 32 and drives the compressed air supply device 81 when the SOFC 13 is activated.

In other words, the compressed air supply device 81 that can be individually driven is provided separately from the compressor 21 of the gas turbine 11, and the compressed air supply device 81 is driven when the SOFC 13 is activated. Therefore, the total quantity of compressed air compressed by the compressor 21 is delivered to the combustor 22 and the turbine 23, and the total quantity of compressed air compressed by the compressed air supply device 81 is delivered to the SOFC 13. Therefore, it is possible to suppress the air shortage in the gas turbine 11.

Describing in detail, as illustrated in FIG. 6, the compressed air supply device 81 includes a third compressed air supply line 83, an activation compressor 84, and the control valve (second on-off valve) 85. One end of the third compressed air supply line 83 is connected between the control valve 32 and the blower 33 on the second compressed air supply line 31, in other words, is connected on the downstream side in the flow direction of the compressed air A2 from the control valve 32 on the second compressed air supply line 31. The activation compressor 84 can be driven by a drive motor 86, and is connected to the other end of the third compressed air supply line 83. The control valve 85 is provided on the third compressed air supply line 83.

The control device 82 can adjust at least the degree of opening of the control valve 32 and the control valve 85, and can control the driving and stopping of the activation compressor 84 by the drive motor 86, and the blower 33. Therefore, when the SOFC 13 is activated, the control device 82 closes the control valve 32, opens the control valve 85, and drives the drive motor 86 to start up the activation compressor 84.

Also, a first sensor 87 is provided on the first compressed air supply line 26. The first sensor 87 measures the first pressure of the compressed air compressed by the compressor 21 of the gas turbine 11. Also, a second sensor 88 is provided on the SOFC 13. The second sensor 88 measures the second pressure of the air electrode of the SOFC 13, in other words, the pressure on the SOFC 13 side from the control valve 32 on the second compressed air supply line 31. The sensors 87, 88 output the measured first pressure and second pressure to the control device 82.

Also, when the second pressure measured by the second sensor 88 reaches the first pressure measured by the first sensor 87, the control device 82 stops the driving of the compressed air supply device 81. In other words, when the second pressure reaches the first pressure, the driving of the drive motor 86 is stopped so the activation compressor 84 is stopped, and the control valve 85 is closed. At the same time, the control device 82 opens the control valve 32.

Here, the method for activating the SOFC 13 in the power generation system 10 according to the third embodiment as described above is described.

The method for activating the SOFC 13 in the power generation system 10 according to the third embodiment includes the steps of: supplying compressed air compressed by the compressor 21 of the gas turbine 11 to the combustor 22; supplying compressed air compressed by the compressed air supply device 81 to the air electrode of the SOFC 13; stopping the supply of compressed air to the air electrode by the compressed air supply device 81 when the pressure of the air electrode side reaches the pressure of the compressed air compressed by the compressor 21; and supplying a portion of the compressed air compressed by the compressor 21 to the air electrode of the SOFC 13.

In other words, as shown in FIG. 7, at time t1, the gas turbine 11 is activated, and after a predetermined period of time has passed, power starts to be generated by the gas turbine 11, and at time t2, the SOFC 13 is activated. In this case, the gas turbine 11 may be operated under low load operating conditions, or it may be operated under rated operating conditions. At time t2, the control valve 85 is opened while maintaining the closed condition of the control valve 32, and the activation compressor 84 is driven by the drive motor 86. Then, in the gas turbine 11, the total quantity of the compressed air A1 compressed by the compressor 21 flows to the combustor 22 and the turbine 23, without going to the SOFC 13 side, so the outlet pressure (first pressure) of the compressor 21 is maintained at a predetermined pressure without dropping. On the other hand, in the SOFC 13, the compressed air A4 compressed by the activation compressor 84 flows to the SOFC 13 through the third compressed air supply line 83 and the second compressed air supply line 31, so the pressure of the SOFC 13 (second pressure) gradually increases.

Then, at time t3, when the second pressure reaches the first pressure, the activation compressor 84 is stopped by the drive motor 86, the control valve 85 is closed, and at the same time, the control valve 32 is opened.

Then, pressurization of the SOFC 13 by the compressed air supply device 81 is completed, and the control valve 32 is fully opened and the blower 33 is driven. Then, the pressure on the air electrode side of the SOFC 13 further increases, up to the target pressure.

In this way, the power generation system according to the third embodiment includes the gas turbine 11 having the compressor 21, the combustor 22, and the turbine 23; the first compressed air supply line 26 for supplying compressed air compressed by the compressor 21 to the combustor 22; the SOFC 13 having the air electrode and the fuel electrode; the second compressed air supply line 31 for supplying at least a portion of the compressed air compressed by the compressor 21 to the air electrode; the control valve 32 provided on the second compressed air supply line; the compressed air supply device 81 connected to the second compressed air supply line 31 on the SOFC 13 side from the control valve 32; and the control device 82 for closing the control valve 32 and driving the compressed air supply device 81 when the SOFC 13 is activated.

Therefore, the compressed air supply device 81 is provided separately from the compressor 21 of the gas turbine 11, and when the SOFC 13 is activated, the compressed air supply device 81 is driven. Then, when the SOFC 13 is activated, the total quantity of the compressed air compressed by the compressor 21 is delivered to the combustor 22 and the turbine 23, and the total quantity of the compressed air compressed by the compressed air supply device 81 is delivered to the SOFC 13. Therefore, at this time, there is no shortage of compressed air in the combustor 22 and the turbine 23, so it is possible to suppress faulty combustion in the combustor 22 and insufficient cooling in the turbine 23. As a result, the air shortage in the gas turbine 11 is suppressed, so it is possible to activate the SOFC 13 while stably operating the gas turbine 11.

In the power generation system according to the third embodiment, the third compressed air supply line 83 that is connected at one end thereof to the second compressed air supply line 31 between the control valve 32 and the blower 33, the activation compressor 84 that is connected to the other end of the third compressed air supply line 83, and the control valve 85 provided on the third compressed air supply line 83 are provided as the compressed air supply device 81, and the control device 82 closes the control valve 32 and opens the control valve 85 when the SOFC 13 is activated. Therefore, compressed air is delivered to the combustor 22 and the SOFC 13 from the separate compressors 21, 84 respectively, so it is possible to appropriately suppress the air shortage in the gas turbine 11 with a simple configuration.

In the power generation system according to the third embodiment, the first sensor 87 that measures the first pressure of the compressed air compressed by the compressor 21 and the second sensor 88 that measures the second pressure of the SOFC 13 are provided, and when the second pressure reaches the first pressure, the control device 82 stops the driving of the compressed air supply device 81, and opens the control valve 32. Therefore, by just using the compressed air supply device 81 for pressurization of the SOFC 13, it is possible to reduce the size of the compressed air supply device 81 and achieve low cost.

In the power generation system according to the third embodiment, as described above, the compressed air supply device 81 which can be individually driven is provided separately from the compressor 21 of the gas turbine 11, so prior to activation of the gas turbine 11, it is possible to supply air to and pressurize the SOFC 13 from the compressed air supply device 81. Therefore, by pressurizing the SOFC 13 in advance, regardless of the activation of the gas turbine 11, it is possible to rapidly activate the power generation system 10.

Also, the method for activating the solid oxide fuel cell in the power generation system according to the third embodiment includes the steps of: supplying compressed air compressed by the compressor 21 of the gas turbine 11 to the combustor 22; supplying compressed air compressed by the compressed air supply device 81 to the air electrode of the SOFC 13; stopping the supply of compressed air to the air electrode by the compressed air supply device 81 when the pressure of the air electrode side reaches the pressure of the compressed air compressed by the compressor 21; and supplying a portion of the compressed air compressed by the compressor 21 to the air electrode of the SOFC 13.

Therefore, when the SOFC 13 is activated, there is no shortage of compressed air in the combustor 22 or the turbine 23, air shortage in the gas turbine 11 is suppressed, so it is possible to stably activate the SOFC 13 while stably operating the gas turbine 11. Note that the system is configured so that a portion of the compressed air compressed by the compressor 21 is supplied to the air electrode of the SOFC 13, but all of the compressed air compressed by the compressor 21 may be supplied to the air electrode of the SOFC 13.

In the third embodiment as described above, the first on-off valve and the second on-off valve are the control valves 32, 85 that are capable of adjusting the flow rate, but they may be cutoff valves that are not capable of controlling the flow rate.

REFERENCE SIGNS LIST

10 Power generation system
11 Gas turbine
12 Generator
13 Solid oxide fuel cell (SOFC)
14 Steam turbine
15 Generator
21 Compressor
22 Combustor
23 Turbine
26 First compressed air supply line
27 First fuel gas supply line
31 Second compressed air supply line
32 Control valve (on-off valve)
33 Blower
34 Exhaust air line
36 Compressed air circulation line
41 Second fuel gas supply line
42 Control valve
43 Exhaust fuel line
45 Exhaust fuel gas supply line
49 Fuel gas recirculation line
61 Control device (control unit)
62 First sensor
63 Second sensor
71 First cutoff valve (first on-off valve)
72 Second cutoff valve (second on-off valve)
81 Compressed air supply device (compressed air supply unit)
82 Control device (control unit)
83 Third compressed air supply line
84 Activation compressor
85 Control valve (second on-off valve)
87 First sensor
88 Second sensor

The invention claimed is:
1. A power generation system, comprising:
a gas turbine having a compressor and a combustor;
a first compressed air supply line for supplying compressed air compressed by the compressor to the combustor;

a fuel cell having an air electrode and a fuel electrode;

a second compressed air supply line for supplying at least a portion of the compressed air compressed by the compressor to the air electrode;

a first on-off valve provided on the second compressed air supply line;

a compressed air supply unit connected to the second compressed air supply line on the fuel cell side from the first on-off valve; and a control unit for closing the first on-off valve and driving the compressed air supply unit upon the fuel cell being activated.

2. The power generation system according to claim 1, wherein the compressed air supply unit includes a third compressed air supply line connected at one end thereof to the second compressed air supply line on the fuel cell side from the first on-off valve, an activation compressor connected to the other end of the third compressed air supply line, and a second on-off valve provided on the third compressed air supply line, and upon the fuel cell being activated, the control unit closes the first on-off valve, opens the second on-off valve, and drives the activation compressor.

3. The power generation system according to claim 1, further comprising a first sensor that measures the pressure of the compressed air compressed by the compressor and a second sensor that measures the pressure of the second compressed air supply line on the fuel cell side from the first on-off valve, wherein upon a second pressure measured by the second sensor reaches a first pressure measured by the first sensor, the control unit stops the driving of the compressed air supply unit and opens the first on-off valve.

\* \* \* \* \*